UNITED STATES PATENT OFFICE.

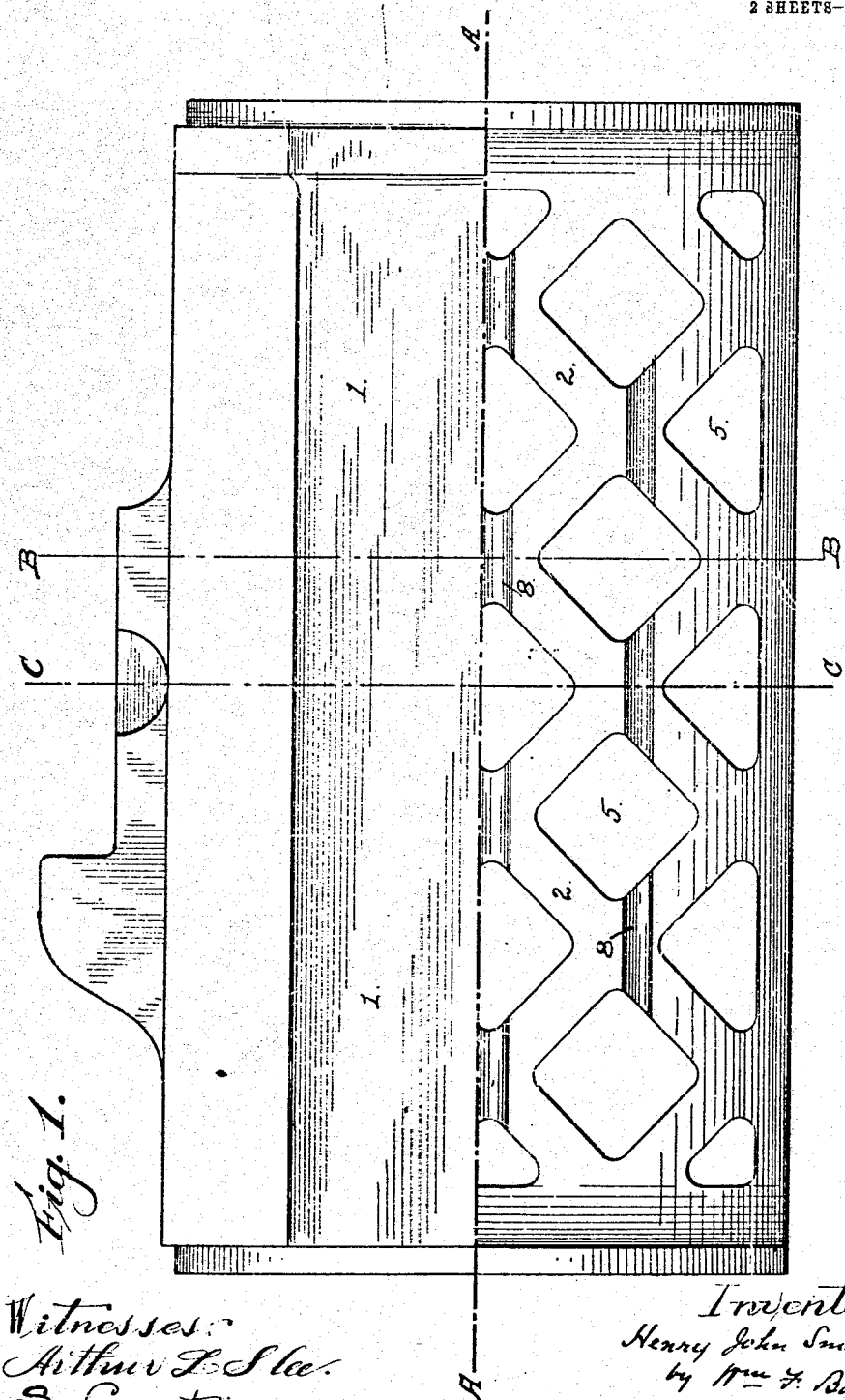

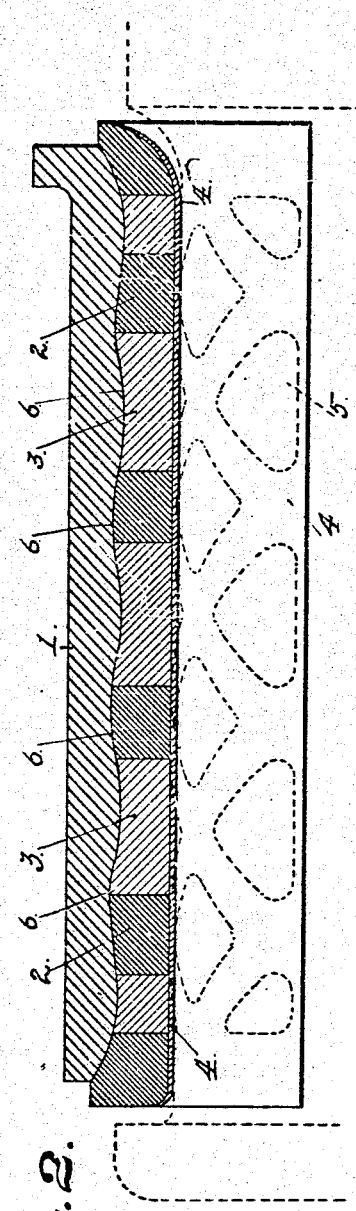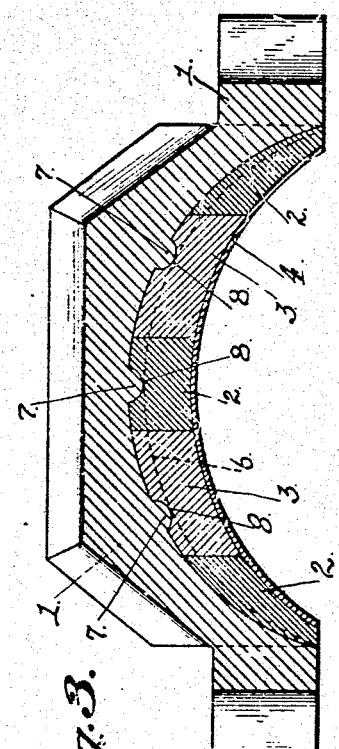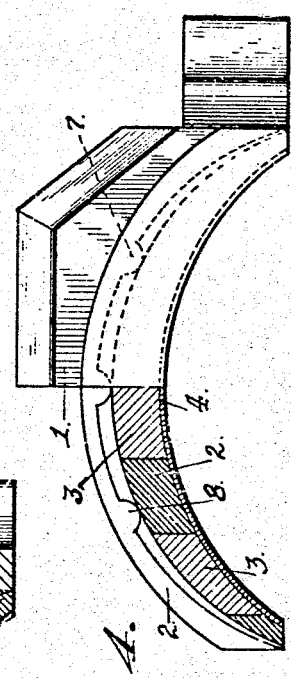

HENRY JOHN SMALL, OF SAN FRANCISCO, CALIFORNIA.

JOURNAL-BRASS.

971,085.   Specification of Letters Patent.   Patented Sept. 27, 1910.

Application filed August 12, 1909. Serial No. 512,525.

*To all whom it may concern:*

Be it known that I, HENRY JOHN SMALL, a citizen of the United States, residing in the city and county of San Francisco and State of California, have invented certain new and useful Improvements in Journal-Brasses, of which the following is a specification.

My invention relates to the class of journal-bearings for car-axle boxes, and particularly to that type in which the bearing is a composite one.

The object of my invention is to provide an economical journal bearing with simple and effective means for holding its members together and preventing both longitudinal and circumferential relative movements; and to this end my invention consists in the novel construction and interengagement of parts which I shall now fully describe, by reference to the accompanying drawings in which—

Figure 1 is a plan view, one-half of the backing member being cut away to show the grid-iron or grated character of the brass component of the journal member, the other components of said member not being shown. Fig. 2 is a longitudinal section on the line A—A of Fig. 1, the Babbitt metal and lead lining components of the journal member being here shown in place. Fig. 3 is a cross section on the line B—B of Fig. 1. Fig. 4 is a part cross section on the line C—C of Fig. 1, and part end view of the bearing. In both Figs. 3 and 4 the Babbitt metal and lead lining are in place.

The journal bearing is formed of a backing member 1, which is, for the sake of economy, made of malleable iron; and a journal bearing member which is composed of the "brass" 2 of customary bronze composition, the filling 3 of some softer metal, as Babbitt; and the inner lead lining 4.

The brass 2 is grated as shown by the openings 5 in Fig. 1, and into these the Babbitt metal 3 is poured and fills them, as seen in Figs. 2, 3 and 4. The lining 4 covers the inner surfaces of the brass and Babbitt.

In order to hold the two members, namely the outer backing 1 and the babbitt-filled and lead-lined "brass" 2 together, and prevent relative movement either longitudinally or circumferentially, the adjacent or contiguous surfaces of the two are circumferentially complementally corrugated as shown at 6 in Fig. 2, which corrugations, interengaging or fitting each other, prevent endwise relative movement; and also on the surface of one of these members, here shown as on the backing member are made longitudinal ribs 7 which fit in corresponding longitudinal grooves 8 in the other member, which interengaging ribs and grooves prevent crosswise or circumferential relative movement. These several engagements to prevent relative movement of the members are simple and effective, are easily and cheaply made, and do away with the more complex and expensive additional and extra constructions usually employed to fit and hold the components of this type of journal bearings together.

Having thus described the invention what I claim as new and desire to secure by Letters Patent is:—

In a journal bearing, the combination of an outer backing of malleable iron and a journal bearing member comprising a grated brass member and a filling of softer metal, the said journal bearing member having a substantially continuous inner surface free from openings or protuberances, and the contiguous surfaces of said journal member and backing member having interengaging elevations and depressions curved in cross section and being straight, parallel and extending from edge to edge of said members, the inner surface of the journal bearing member having a plurality of separated longitudinal straight and parallel recesses curved in cross section and extending from end to end and said backing member being provided with complementary longitudinal heads or raised portions interfitting said recesses, and a lead lining of independent construction fitting over the continuous surface of the journal bearing and secured to the latter.

In testimony whereof I have signed my name to this specification in the presence of two subscribing witnesses.

HENRY JOHN SMALL.

Witnesses:
M. H. SHIELDS,
H. H. HUMMEL.